United States Patent [19]

Leaton

[11] Patent Number: 4,927,004
[45] Date of Patent: May 22, 1990

[54] FEEDER

[75] Inventor: Timothy H. Leaton, Ascot, Great Britain

[73] Assignee: Etablissement Gersan, Vaduz, Liechtenstein

[21] Appl. No.: 163,004

[22] Filed: Mar. 2, 1988

[30] Foreign Application Priority Data

Mar. 2, 1987 [GB] United Kingdom ................ 8704830

[51] Int. Cl.⁵ .............................................. B65G 17/36
[52] U.S. Cl. ..................................... 198/704; 198/626; 198/711; 198/714; 198/817
[58] Field of Search ............... 198/626, 817, 703, 713, 198/714, 704, 477.1, 711

[56] References Cited

U.S. PATENT DOCUMENTS

| | | | |
|---|---|---|---|
| 585,693 | 7/1897 | Notter | 198/704 |
| 748,576 | 1/1904 | Bivert | 198/703 |
| 3,750,860 | 8/1973 | Jaffre | 198/704 |
| 4,248,340 | 2/1981 | Hild | 198/711 |

FOREIGN PATENT DOCUMENTS

| | | | |
|---|---|---|---|
| 0118856 | 9/1984 | European Pat. Off. | |
| 0124740 | 11/1984 | European Pat. Off. | |
| 0174221 | 3/1986 | European Pat. Off. | |
| 0229385 | 7/1987 | European Pat. Off. | |
| 968397 | 2/1958 | Fed. Rep. of Germany | 198/626 |
| 58915 | 10/1967 | Fed. Rep. of Germany | 198/626 |
| 1595480 | 6/1970 | France | 198/626 |
| 690444 | 6/1965 | Italy | 198/626 |
| 81/0265 | 1/1981 | South Africa | |
| 80/429 | 1/1981 | South Africa | |
| 312298 | 5/1929 | United Kingdom | |
| 378848 | 8/1932 | United Kingdom | |
| 463988 | 4/1937 | United Kingdom | |
| 518401 | 2/1940 | United Kingdom | |
| 1114844 | 5/1968 | United Kingdom | |
| 1220672 | 1/1971 | United Kingdom | |
| 1220919 | 1/1971 | United Kingdom | |
| 1274267 | 5/1972 | United Kingdom | |
| 638723 | 6/1974 | United Kingdom | 198/704 |
| 1363902 | 8/1974 | United Kingdom | |
| 1382479 | 2/1975 | United Kingdom | |
| 1400647 | 7/1975 | United Kingdom | |
| 1414011 | 11/1975 | United Kingdom | |
| 2066196 | 7/1981 | United Kingdom | |
| 1599835 | 10/1981 | United Kingdom | |
| 2167029 | 5/1986 | United Kingdom | |
| 2169885 | 7/1986 | United Kingdom | |
| 2171682 | 9/1986 | United Kingdom | |

Primary Examiner—Andres Kashnikow
Assistant Examiner—Christopher G. Trainor
Attorney, Agent, or Firm—Kerkam, Stowell, Kondracki & Clarke

[57] ABSTRACT

In order to improve the accuracy of spacing, direction and velocity, a feeder for feeding discrete objects one by one has a belt which circulates at a controlled speed. The belt carries a series of buckets formed by four flaps which are normally closed but can be opened by a cam adjacent the path of the buckets. The objects are inserted one by one in the buckets adjacent the top of their vertical descent, and are discharged when the flaps are opened. In this way, the buckets define the spacing and velocity of the objects.

11 Claims, 11 Drawing Sheets

FEEDER

BACKGROUND OF THE INVENTION

The present invention relates to a feeder for feeding solid material at a predetermined spacing and at a predetermined velocity.

The feeder is particularly for feeding and discharging discrete objects one by one, i.e. a single particle feeder. However, the feeder can also be used for feeding groups of a small number of objects at a predetermined spacing and velocity, or for dividing up a stream of small particles and feeding quantities of the particles at a predetermined spacing and velocity.

The invention was particularly designed for feeding gem stones such as diamonds, for positioning after an accelerator which provides single feed at an approximately synchronous rate but with the directions of the individual stones differing slightly and the gaps between individual stones differing slightly. The stones may for instance be travelling vertically at about 15 per second at a speed of 1-3 m/s. The stones may for instance be being passed to a machine for weighing them or sizing them or otherwise examining them. It is desirable to improve the accuracy of the spacing, direction and velocity when using high speed apparatus.

For example, the gem stones may have a diameter of about 5 mm and be projected vertically downwards through an 18 mm diameter hole which is 200 mm below the release point from the feeder—the 200 mm is to permit the incorporation of detector assemblies etc. The stones themselves can behave erratically as they may for instance be in the forms of platelets with a somewhat aerofoil cross-section, and also air currents or windage can have a significant effect during the 200 mm vertical travel. It is therefore important that the feeder itself should be as accurate as possible.

The Invention

In accordance with the present invention, the feeder comprises a series of spaced containers which in a feed section descend substantially vertically through a substantial distance, at a predetermined spacing and at a predetermined velocity, each successive container being arranged to receive the solid material as it descends and to discharge the material at the lower end part of the feed section.

As the containers are descending in the feed section, the solid material will be accelerating under gravity when it reaches the containers; the feeder is arranged so that the velocity of descent of the containers is roughly equal to that of the solid material at the top of the feed section and the solid material catches up with the respective container and settles down in the container, i.e. becomes stationary relative to the container; the substantial descent allows this, and within reason, the greater the length of the feed section, the more accurate the feed. If a succession of spaced single objects are being fed, the spacings should be roughly matched at the top of the feed section to avoid a double feed or nipping an object between the two parts of a container (if the containers are in this form). However, there is significant latitude and the spacing of the feed into the feeder can for example have a range of $\pm\frac{1}{4}$ the spacing of the containers.

In theory, it is possible to use a one-piece container, but it is important not to impose any lateral forces on the solid material at the bottom of the feed section so that the solid material goes straight on down (e.g. within a vertical axis cone of 5° half angle); thus the container must be arranged to come away as cleanly as possible from the solid material at the bottom of the feed section. In general, it is preferred that the bottom of each container should open in order to discharge the solid material, and this can be arranged by having the bottom (at least) of each container formed of at least two parts which separate in order to open the bottom—three or more parts are possible and four parts are preferred if high accuracy is required.

To avoid applying lateral forces, the bottom of each container should open generally downwards, and it is desirable that, at least after an initial movement, the bottom should accelerate downwards faster than gravity. This can be arranged by tipping the respective container part down from its normal relationship to say a carrying belt, at the bottom of the feed section. This can be done if the container parts are carried on belts by using small ligatures to tip the container parts down, or by using camming. The same principles can be applied to three or four container parts, to reduce or avoid sliding movement between the container parts and the solid material. The four container parts could be arranged to be carried on a single belt or on two belts.

The containers should provide a pocket which is large enough to stop the solid material bouncing out. Particularly if the solid material is in the form of discrete objects, there may be some tendency to bounce, and this can be reduced by making the containers of flexible material so that they are a little compliant.

Preferred Embodiments

The invention will be further described, by way of example, with reference to the accompanying drawings, in which.

Fig. 1–3

Figure 1:
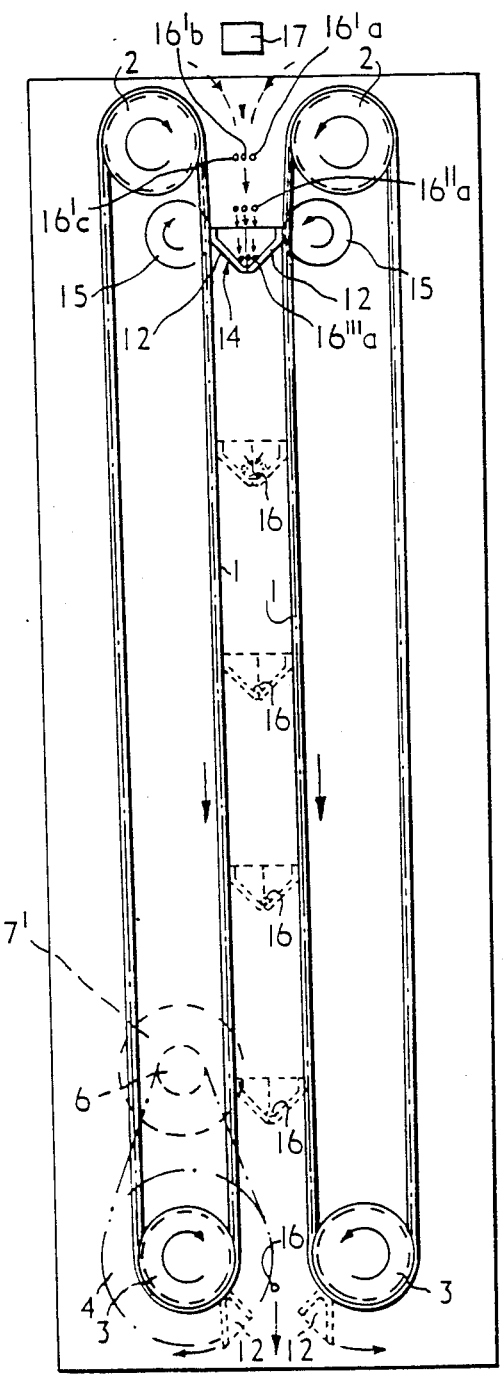
FIG. 1 is a schematic elevation of a feeder in accordance with the invention.
Figure 2:
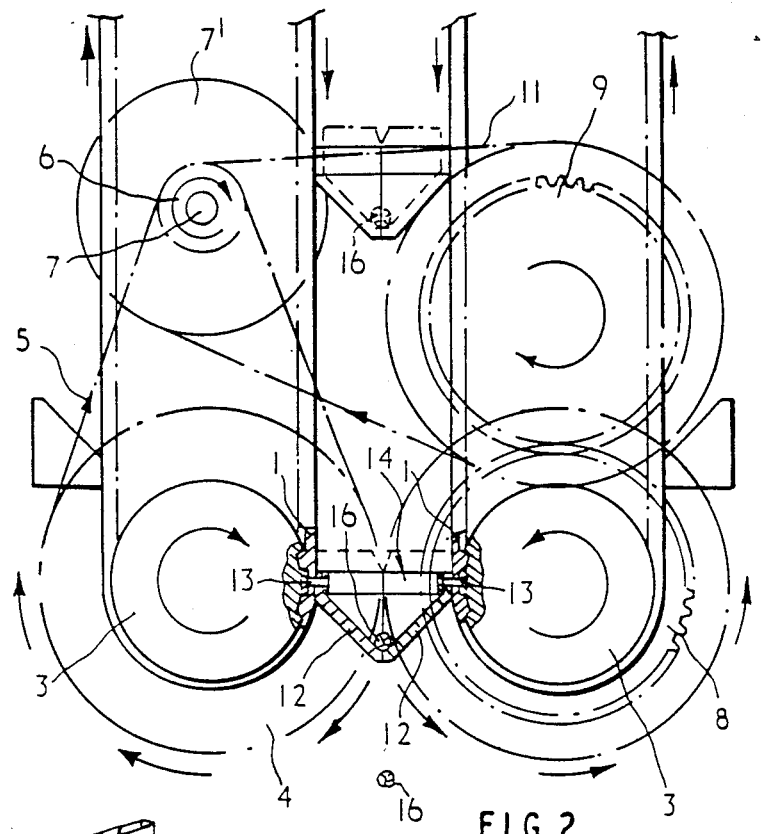
FIG. 2 is a detail, showing the bottom part of FIG. 1.
Figure 3:
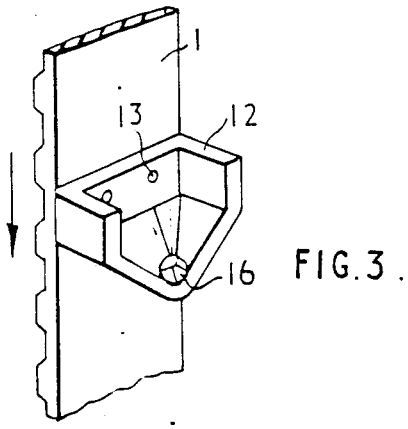
FIG. 3 is an isometric detail of FIG. 1, showing one container half.

The feeder of FIGS. 1–3 has two conventional toothed belts 1 which pass around top pulleys 2 and toothed bottom pulleys 3. As shown in FIG. 2, one bottom pulley 3 is driven by a pulley 4 connected by a belt 5 to a pulley 6 on the shaft 7 of a motor 7' having an encoder for electronic control using standard techniques (for instance to feed 15 buckets per second at a speed of 2 m/s - see below). The other bottom pulley 3 is driven by a pinion 8 which meshes with a pinion 9 in turn driven by a pulley 10 connected by a belt 22 to the drive pulley 6—for direction reversal. An alternative is to connect both bottom pulleys 3 to meshing pinions. Each belt 1 carries a series of equispaced container or bucket parts or halves 12 formed of a flexible material such as polyurethane rubber. The bucket halves 12 are secured by small screws 13 whose heads can be accommodated in two grooves machined in the bottom pulleys 3. The bucket halves 12 meet to form a series of spaced containers or pockets or buckets 14, i.e. the belts 1 support the halves 12 so that they adjoin in the feed section to form the buckets 14. The buckets 14 descend vertically, i.e. rectilinearly, through a substantial distance, at a predetermined spacing and at a predetermined velocity in a feed section which extends downwards from guide pulleys 15 to the bottom pulleys 3, the bucket halves 12 separating at the bottom of the feed section in order to open the bottom of the bucket 14. In order to prevent the bucket halves 12 fouling one another as they pass over the top pulleys 2, the top pulleys 2 are slightly further apart than the bottom pulleys 3 and, after passing over the top pulleys 2, the belts 1 approach slowly before they pass over the guide pulleys 15, the belts 1 then travelling parallel to one another down the whole feed section to the pulleys 3. Between the guide pulleys 15 and the bottom pulleys 3, the belts 1 can slide over stainless steel control blocks (not shown) to keep them strictly parallel. This is important because the spacing between the belts 1 is such that the belts 1 apply positive closing pressure or a slight nip between the bucket halves 12.

FIG. 1 illustrates a gem stone 16 as it descends into and through the feed section. The gem stone 16 is projected downwards by a supply feeder indicated schematically at 17, which may be an accelerator, e.g. as in GB-A-2 167 029 or a pin wheel, e.g. as in GB-A-2 171 682; at the top of the feed section, at the guide pulleys 15, the stone 16 is descending at approximately the same speed as the respective bucket 14. In order to illustrate what happens if the stone 16 is slightly ahead of its calculated position and/or if the stone 16 is slightly off the centre line, the stone 16 is illustrated in the top part of FIG. 1 in nine different positions, positions 16b being on the centre line and positions 16" being the correct positions time-wise - positions 16' represent late stones and positions 16''' represent early stones; the distance between positions 16' and 16''' represent roughly the maximum range, and is roughly equal to half the distance between adjacent buckets 14. If the stone 16 is off the centre line (16a or 16c), it still moves into the bottom of the bucket 14, where it will rest approximately on the centre line. If the stone 16 is at its normal timing or late, it will have engaged the bottom of the bucket 14 and reached its rest position not later than four fifths of the way down the feed section.

At the bottom, as the belts 1 pass under the bottom pulleys 3, the belts 1 move the bucket halves 12 away from each other and open the bottoms of the respective buckets 14, thereby discharging the respective stones 16. By fixing each bucket half 12 to the belt 1 at a level adjacent the top of the bucket 14, the bottom of the bucket 14 is accelerated downwards and outwards at a greater rate than would otherwise be the case. However, as described below, other arrangements can be provided for accelerating the bottom of the bucket 14 downwards.

In one arrangement, the feeder is used for feeding stones of 2 point to 15 carat, and preferably from 5 point to 5 carat (1 point=0.01 carat, 1 carat=0.2 gm). In such a case, the feeder may have a height of 500 mm from the axis of a bottom pulley 3 to the axis of a top pulley 2, there being twelve bucket halves 12 on each belt 1.

FIG. 4

Figure 4:
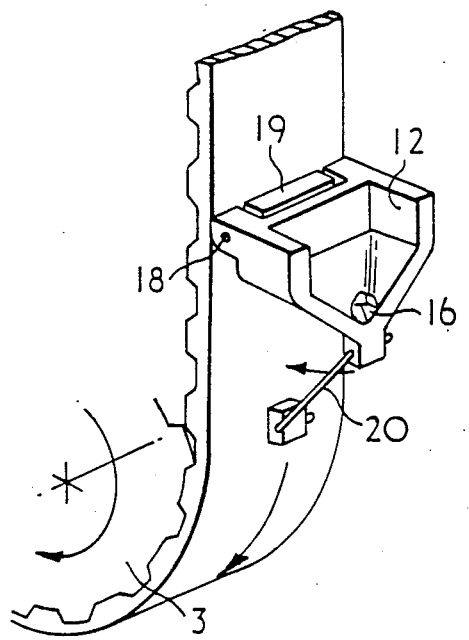
FIGS. 4 to 6 are isometric details of second, third and fourth embodiments of the invention.

FIG. 4 shows an arrangement similar to that of the embodiment of FIGS. 1–3, but the bucket half 12 is pivoted about a horizontal pivot pin 18 to a small block 19 fixed to the belt 1. The lower portion of each bucket half 12 is linked to the belt 1 below the level of the bucket 14 by a small ligature or link 20 so that as the belt 1 passes under the bottom pulley 3, the bucket halves 12 are tipped down from their normal relationship to the belt 1, thereby providing rapid opening of the bucket 14 and keeping disturbance of the stone 16 to the minimum. Some means are provided for biasing the halves upwards into their closed positions.

FIG. 5

Figure 5:
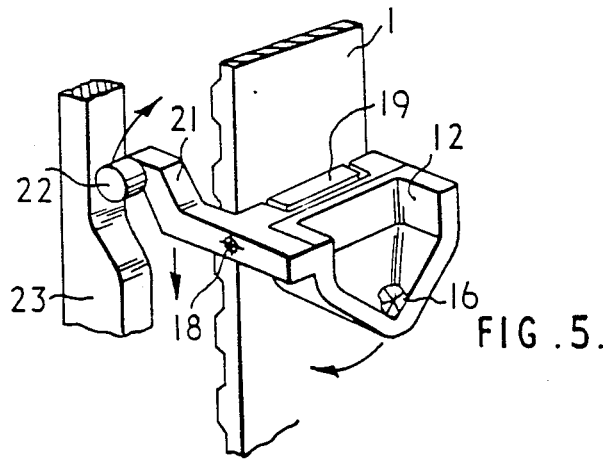

FIG. 5 shows an arrangement generally similar to that of FIGS. 1–3, and the bucket halves 12 are generally similar to that shown in FIG. 4. However, each bucket half 12 has an actuating arm 21 which carries a cam follower roller 22 for engaging a cam 23 adjacent the bottom of the feed section, thereby rapidly tipping the bucket half 12 down.

FIG. 6

Figure 6:
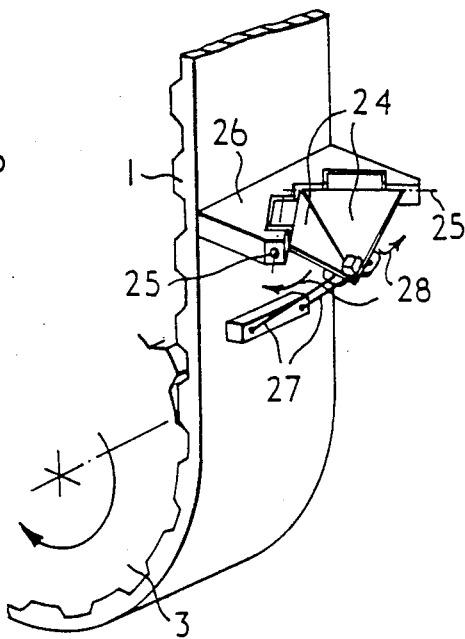

FIG. 6 illustrates an arrangment similar to that of the embodiment of FIG. 4, but each bucket 14 is formed of four bucket parts or flaps 24 which are pivoted by respective horizontal pivot pins 25 to a suitably modified mount 26 fixed to the belt 1. Each flap 24 is linked to the belt 1 below the level of the bucket 14 by a respective ligature or link 27. Although the flaps 24 are pivoted to the mount 26 about axes at 90° to each other (and at 45° to the belt 1), the opening of the bucket 14 is similar to that described in relation to FIG. 4, the flaps 24 swinging down in the directions indicated by arrows 28.

Figure 7:
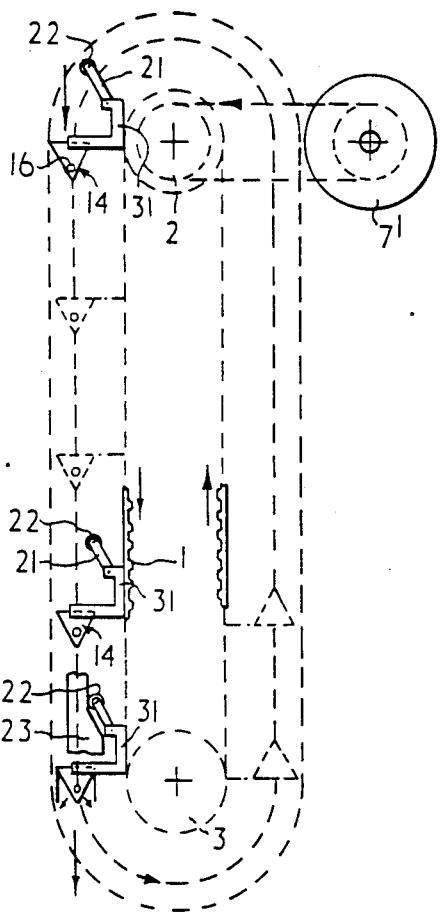
FIG. 7 is a schematic elevation of a fifth embodiment of the invention.
Figure 8:
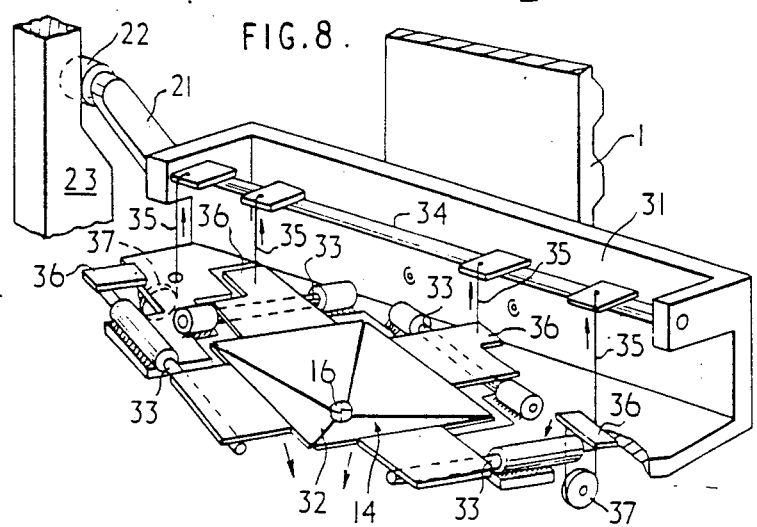
FIG. 8 is an isometric detail of FIG. 7.
Figure 9:
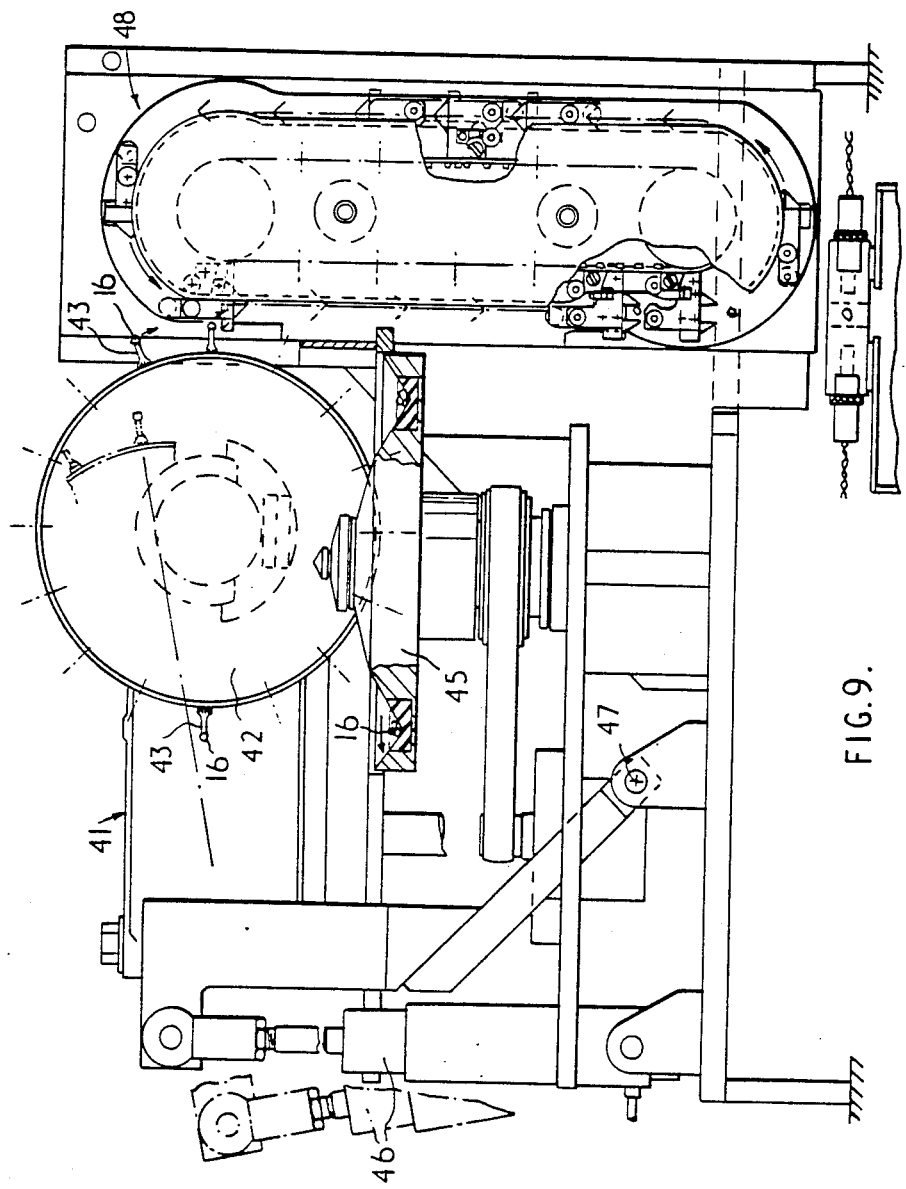
FIGS. 9 to 11 are an elevation, a plan, and an end view of a sixth embodiment of the invention, FIGS. 9 and 10 also showing the supply feeder.
Figure 10:
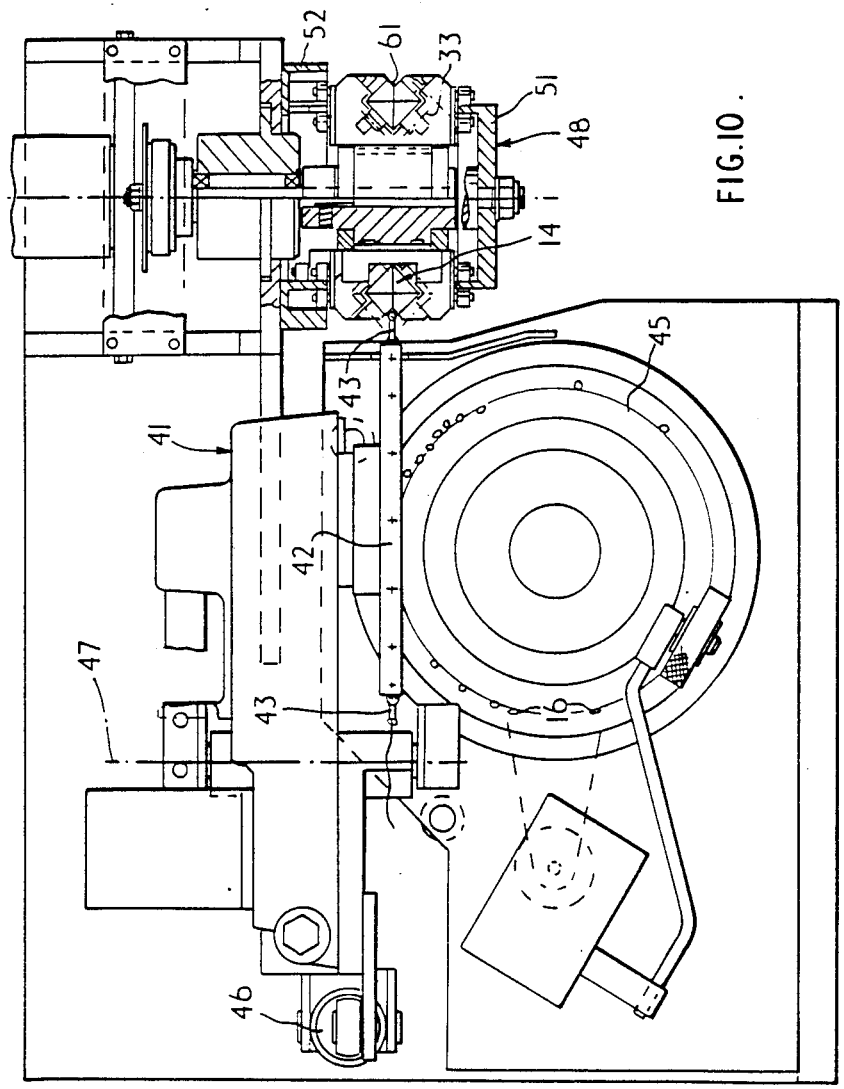

FIGS. 7 and 8

FIGS. 7 and 8 show an arrangement where only a single belt 1 is used. In this case, a complex mount or housing 31 is screwed to the belt 1, and has bearings for pivoting four bucket parts or petal-like, triangular flaps 32 about pivot spindles 33 each at 45° to the belt 1, adjacent spindles 33 being at 90° to each other. The cam follower arm 21 in this case is fixed to a cross-member 34 which is linked by small cords 35 to appropriate levers 36 in turn fixed to the flaps 32, two pulleys 37 being required to do this. Again, the cam 23 assures rapid opening of the flaps 32 forming the bucket 14 at the bottom of the feed section.

FIG. 7 illustrates that the drive motor 7' can drive the top pulleys 2 rather than the bottom pulleys 3.

FIGS. 9–19

The arrangement of FIGS. 9–19 is an operative laboratory test rig, based on the principle illustrated in FIGS. 7 and 8. The same references are used for parts performing the same or similar functions.

The arrangement has a supply feeder in the form of a pin wheel feeder 41 as in FIGS. 1–12 of GB-A-2 171 682, but the axis of the pin wheel 42 is horizontal (not inclined at 45°) and there is no annular array of blow-off openings around the nozzle 43. Blow-off is arranged to blow the gem stone 16 off a few millimeters on the descending side of the pin wheel 42. A rotary bowl 45 is indicated, as well as pneumatic retraction ram 46 for swinging the pin wheel 42 up about an axis 47, away from the bowl 45 and the bucket feeder 48.

The bucket feeder 48 has spaced front and back plates 51, 52. The front plate 51 provides a complete guide rail 53 whilst the back plate 52 provides a guide rail 54 for vertical descent and cam track 23 for camming the buckets 14 open.

Each container or bucket assembly has two guide rollers 55, 56 on one side and three guide rollers 55, 56 on the other. The rear guide rollers 55 are mounted on respective pivoted bars 57 which are sprung towards the front guide rollers 55 by tension springs 58. The belt one offers no stiffness, and the rollers 55, 56 give full location in the descending run, i.e. very accurate vertical guidance on the descent, the camming action of the cam track 23 causing no bodily movement of the bucket assembly. Each bucket assembly also has a cam roller 22 for opening the bucket 14. The rollers 22, 55 and 56 are high precision rollers, with their own roller bearings.

Figure 14:
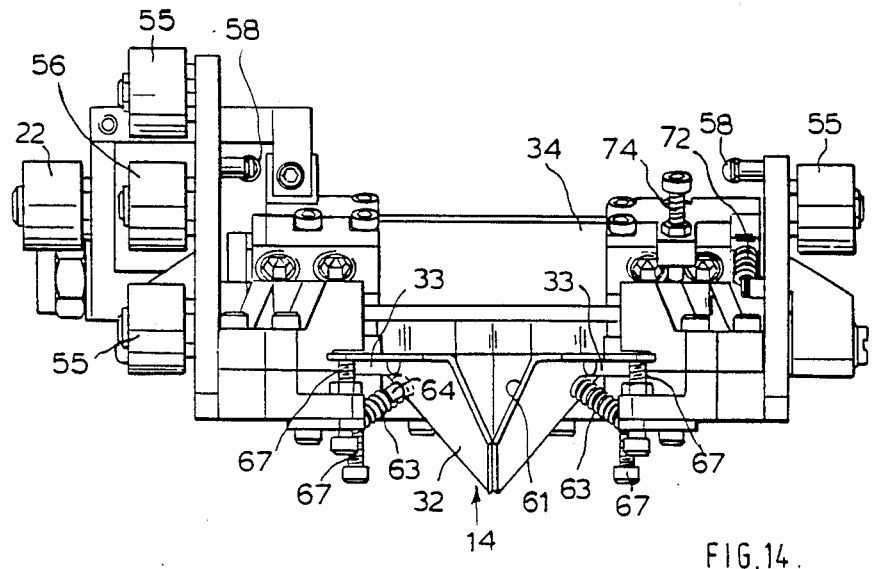
FIGS. 14–19 are a front view, top view, bottom view, each side view and an isometric view of one container assembly in the sixth embodiment.
Figure 15:
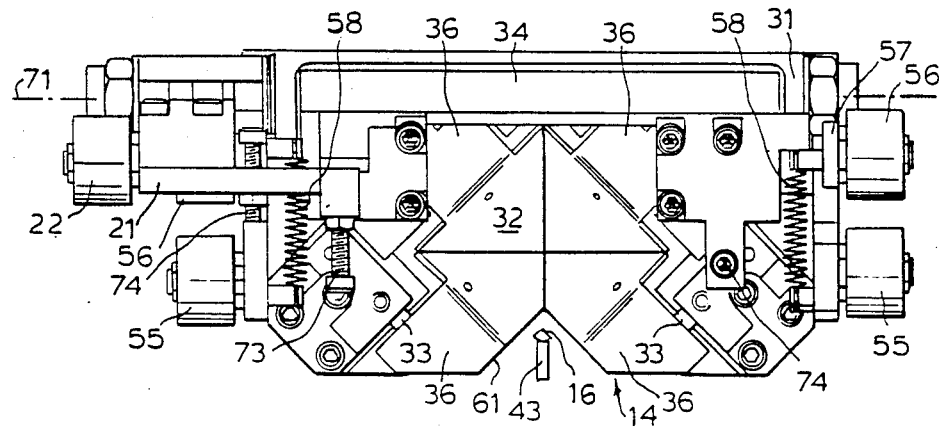
Figure 16:
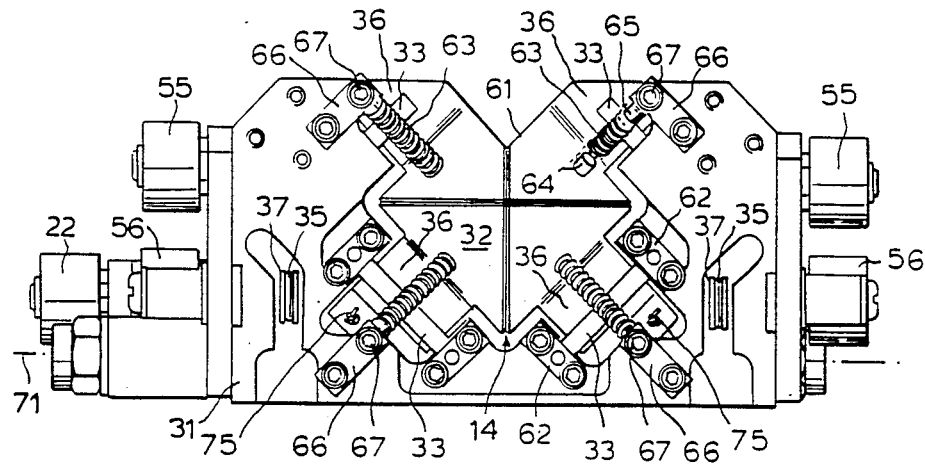
Figure 17:
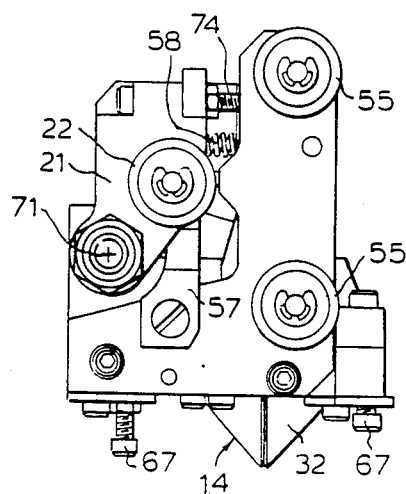

The flaps 32 forming the bucket 14 have a cut-out 61 for the nozzle 43 and stone 16, preventing fouling should the motions not be properly synchronized. Otherwise the flaps 32 and their opening arrangement is generally as in FIG. 8. There is an included angle of just below 90° between the median lines of two opposite flaps 32. Two of the spindles 33 are on overhung stub axes, and two of the spindles 33 are supported each end by bearing blocks 62 (FIG. 16). There is upward biasing by compression spring 63 inserted between a locating stud 64 on the respective flap 32 (one spring 63 is shown faint is FIGS. 14 and 16 to show the stud 64) and a lug 65 on a short projecting bar 66 (visible in FIG. 16). There are adjustable end stops 67 for limiting the upwards, closing movement of the flaps 32 (FIGS. 14 and 16).

Figure 18:
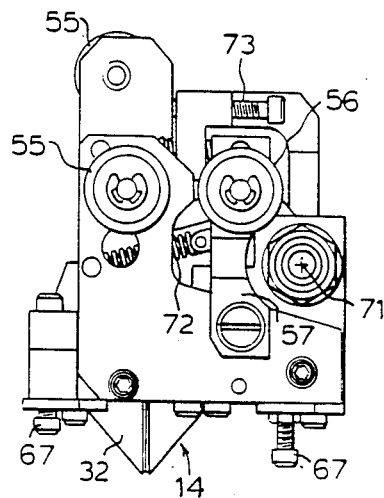
Figure 19:
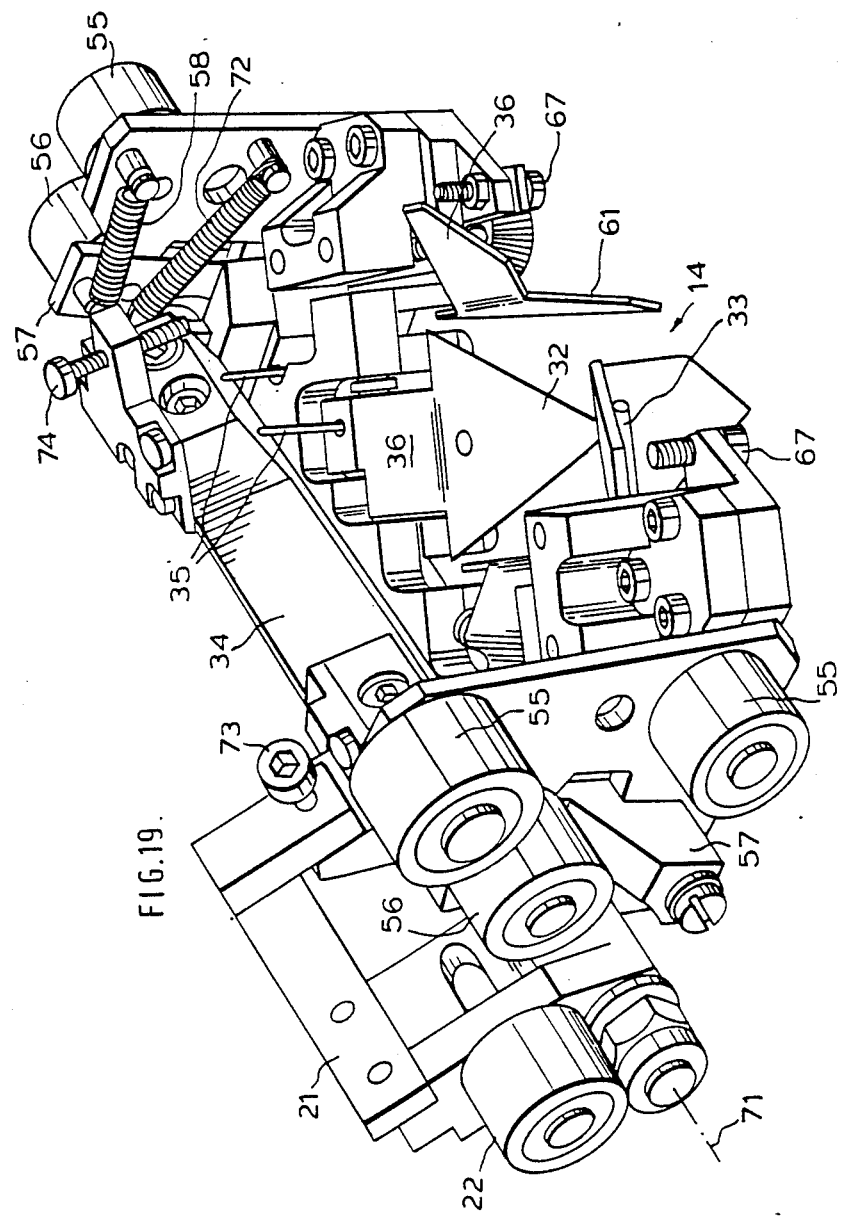

The cross-member 34 of the bucket assembly is roughly U-shaped and pivoted about an axis 71 (FIGS. 15-18), the actuating arm 21 being pivoted independently about the axis 71. The actuating arm 21 is sprung closed by a tension spring 72 (FIG. 18). There is an adjustable connecting rod 73 between the actuating arm 21 and the cross-member 34. There are adjustable end stops 74 (FIGS. 15 and 17) for the cross-member 34. The cords 35 are visible in FIG. 16 where they pass over the pulley 37, and end knots 75 are also visible in FIG. 16.

The experimental bucket assembly was made of aluminium parts bolted together with "Allen" screws, the flaps 32 being made of sheet steel. A production bucket assembly could be of modular form, the parts being moulded in a suitable plastics material.

Figure 11:
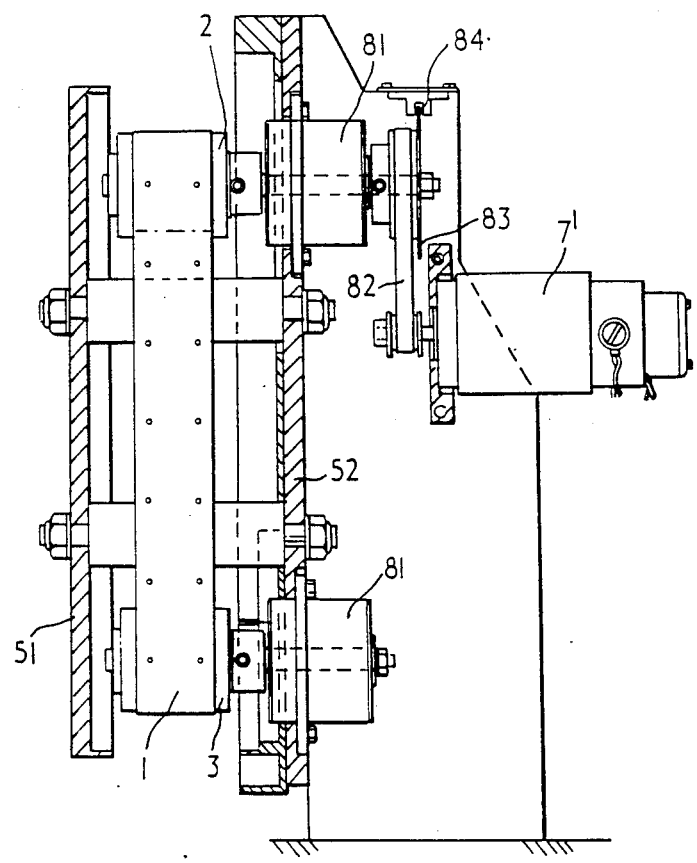
Figure 12:
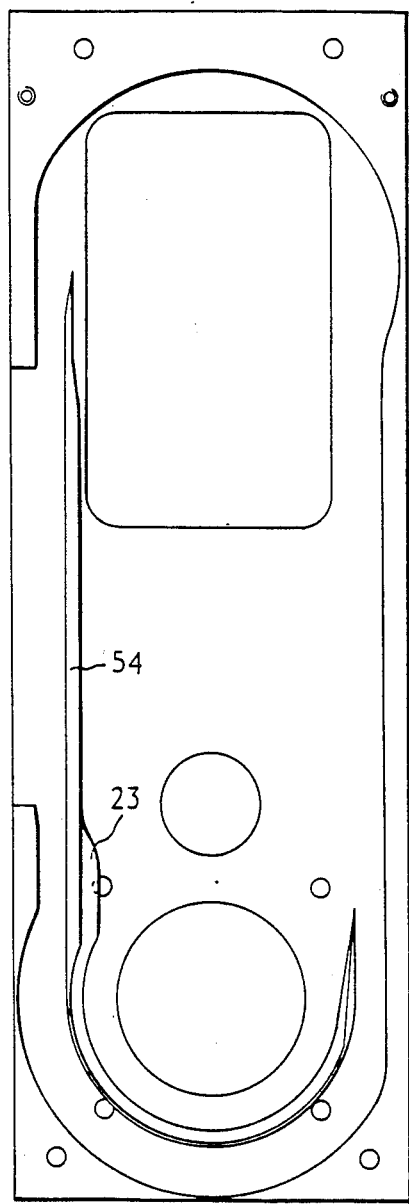
FIGS. 12 and 13 are an elevation of the rear plate, and a rear elevation of the front plate, of the sixth embodiment.
Figure 13:
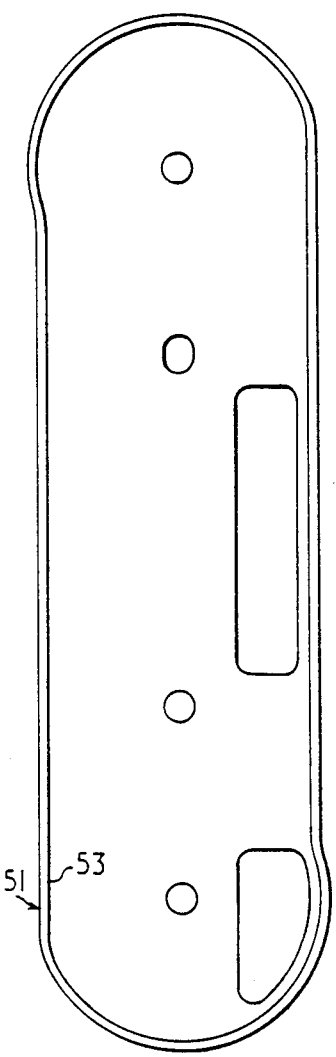

FIG. 11 shows that the top and bottom pulleys 2, 3 are overhung, being supported in large bearings 81. The top pulley 2 is driven by a D.C. motor 7' via a belt 82. An encoder disk 83 rotates with the top pulley 2 and is sensed by an opto-switch 84. The signal from the opto-switch 84 is used to provide strict synchronism with the pin wheel 42 and precise positioning of the nozzle 43 with respect to the bucket 14. As an alternative arrangement, the pulley 2 can be driven by a stepping motor. In a suitable arrangement, the pulleys 2, 3 are on centres about 230 millimeters apart, there are sixteen buckets 14, and the speed is 0.57 m/s linear. The arrangement is such that all the flaps 32 are well synchronized and open smoothly at the same time. The arrangement in general works well if the downwards open acceleration of the flaps 32 is between 0.7 and 4 g (gravity), the optimum range being 1.5-2 g, and the preferred value 1.7 g. The flaps 32 should be fully open before the bottom pulley 3 is reached so that the stone 16 drops clear of the flaps 32 as the bucket 14 swings around the bottom.

Using the experimental rig, the descent of the gem stones 16 from the bottom of the bucket feeder is within a cone half angle of ½°, providing very accurate vertical feed. However, less accurate feeds may be acceptable in other situations.

The present invention has been described above purely by way of example, and modifications can be made within the spirit of the invention. For instance, the belt described above could be formed of two parallel cords or wires, or even with suitable guidance, of a single cord or wire—the term "belt means" is used to cover such arrangements and any arrangement using a circulating, flexible member which functions like a belt.

I claim:

1. A feeder for single feeding of discrete objects at a predetermined spacing and at a predetermined velocity, the feeder comprising:
    a series of spaced containers, each for receiving a single said object;
    means constraining the containers to circulate in a closed path comprising a feed section in which the containers descend substantially vertically through a substantial distance, at said predetermined spacing, the feed section having an upper end and a lower end;
    driving means for driving the containers around said path whereby the containers descend in said feed section at said predetermined velocity; and
    discharging means for discharging the object from each successive container at the lower end of said feed section without imposing any substantial lateral forces on the object during discharge; and
    wherein each container includes a bottom which comprises generally planar openable parts whose lower portions are of generally triangular shape and co-act to form the bottom of the container, said discharging means being for opening said parts.

2. The feeder of claim 1, wherein said constraining means comprises at least one belt means on which the containers are mounted.

3. The feeder of claim 1, and further comprising means for feeding said objects singularly to successive said containers located substantially above said lower end of said feed section.

4. A feeder for single feeding feed of discrete objects at a predetermined spacing and at a predetermined velocity, the feeder comprising:
    a series of spaced containers, each for receiving a single said object;
    means constraining the containers to circulate in a closed path comprising a feed section in which the containers descend substantially vertically through a substantial distance, at said predetermined spacing, the feed section having an upper end and a lower end;
    driving means for driving the containers around said path whereby the containers descend in said feed section at said predetermined velocity; and
    discharging means for discharging the object from each successive container at the lower end of said feed section without imposing any substantial lateral forces on the object during discharge; and
    wherein each container comprises a bottom formed of at least two parts which separate in order to open the bottom of the container at the lower end of the feed section; and
    wherein the discharging means comprises cam means for opening the bottom of each successive container at the lower end of said feed section.

5. A feeder for single feeding discrete objects at a predetermined spacing and at a predetermined velocity, the feeder comprising:
a series of spaced containers, each for receiving a single said object;
means constraining the containers to circulate in a closed path comprising a feed section in which the containers descend substantially vertically through a substantial distance, at said predetermined spacing, the feed section having an upper end and a lower end;
driving means for driving the containers around said path whereby the containers descend in said feed section at said predetermined velocity; and
discharging means for discharging the object from each successive container at the lower end of said feed section without imposing any substantial lateral forces on the object during discharge; and
wherein said constraining means comprises at least one belt means on which the containers are mounted; and
wherein there is a single said belt means, each container comprising a plurality of parts which are mounted on the belt means and open downwards on actuation by said discharging means, the discharging means comprising actuating means for opening the parts at the lower end of the feed section.

6. A feeder for the single feed of discrete objects at a predetermined spacing and at a predetermined velocity, the feeder comprising:
a series of spaced containers, each for receiving a single said object;
means constraining the containers to circulate in a closed path comprising a feed section in which the containers descend substantially vertically through a substantial distance, at a predetermined spacing, the feed section having an upper end and a lower end;
driving means for driving the containers around said path whereby the containers descend in said feed section at a predetermined velocity; and
discharging means for discharging the object from each successive container at the lower end of said feed section;
and wherein said constraining means comprises at least one belt means on which the containers are mounted; and
wherein the bottom of each container is formed of four parts, and comprising, for each container, mounting means secured to the belt means and pivotally mounting each container part about axes at 90° to each other.

7. The feeder of claim 6, wherein said constraining means comprise a pulley around which the belt means passes, the pulley being rotatable about an axis, the mounting means pivoting each part about an axis at 45° to the pulley axis.

8. A feeder for single feeding of discrete objects at a predetermined spacing and at a predetermined velocity, the feeder comprising:
a series of spaced containers, each for receiving a single said object;
means constraining the containers to circulate in a closed path comprising a feed section in which the containers descend substantially vertically through a substantial distance, at said predetermined spacing, the feed section having an upper end and wherein the feeder is a lower end;
driving means for driving the containers around said path whereby the containers descend in said feed section at said predetermined velocity; and
discharging means for discharging the object from each successive container at the lower end of said feed section without imposing any substantial lateral forces on the object during discharge;
and juxtaposed with a further feeder arranged adjacent the upper end of said feed section, and comprising control means for feeding said objects to the containers at the top end of said feed section at approximately the same speed of descent as the containers.

9. A method of single feeding discrete objects at a predetermined spacing and at a predetermined velocity, comprising dropping the objects one-by-one into respective containers of a series of containers which in a feed section descend substantially vertically through a substantial distance, at a constant spacing and at a constant velocity, the successive objects entering the feed section vertically downwards and at approximately the same velocity as the containers;
constraining the containers to circulate in a closed path comprising a feed section in which the containers descend substantially vertically through a substantial distance, at a predetermined spacing, the feed section having an upper end and a lower end;
driving the containers around said path whereby the containers descend in said feed section at a predetermined velocity; and
discharging the object from each successive container at the lower end of said feed section by opening an openable bottom of each container by operation of a means for opening the openable bottom and for accelerating the bottom downwards faster than gravity, whereby the object rests on the bottom of the container, and, on discharge, at least after initial movement, the bottom of the container accelerates downwards faster than gravity and discharges the object adjacent the lower end of the feed section without imposing any substantial lateral forces on the object during discharge.

10. The method of claim 3, wherein said objects are gem stones.

11. A feeder for single feeding of discrete objects at a predetermined spacing and at a predetermined velocity, the feeder comprising:
a series of spaced containers, each for receiving a single said object;
means for constraining the containers to circulate in a closed path comprising a feed section in which the containers descend substantially vertically through a substantial distance, at said predetermined spacing, the feed section having an upper end and a lower end;
driving means for driving the containers around said path whereby the containers descend in said feed section at said predetermined velocity; and
discharge means for discharging the object from each successive container at the lower end of said feed section;
each container comprising an openable bottom, said discharge means comprising means for opening said bottom and accelerating said bottom downwards faster than gravity, whereby the object rests on the bottom of the container, and, on discharge, at least after initial movement, the bottom of the container accelerates downwards faster than gravity and discharges the object without imposing any substantial lateral forces on the object during discharge.

* * * * *

UNITED STATES PATENT AND TRADEMARK OFFICE
CERTIFICATE OF CORRECTION

PATENT NO. : 4,927,004

DATED : May 22, 1990

INVENTOR(S) : Timothy H. LEATON

It is certified that error appears in the above-identified patent and that said Letters Patent is hereby corrected as shown below:

Column 6, line 43, Claim 4, delete "feed".

Column 7, line 1, Claim 5, after "feeding" insert -- of --.

Column 7, line 69, Claim 8, delete "wherein the feeder is".

Column 8, line 8, Claim 8, after "and" insert -- wherein the feeder is --.

Column 8, line 44, Claim 10, delete "3" and insert -- 9 --.

Signed and Sealed this

Twenty-ninth Day of October, 1991

Attest:

HARRY F. MANBECK, JR.

*Attesting Officer*

*Commissioner of Patents and Trademarks*